Dec. 1, 1936.  P. YANNETTA  2,062,628
CLUTCH LOCK
Filed Jan. 25, 1935
Fig. 1.
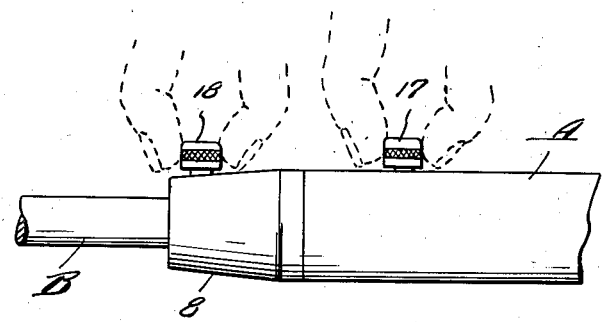
Fig. 2.
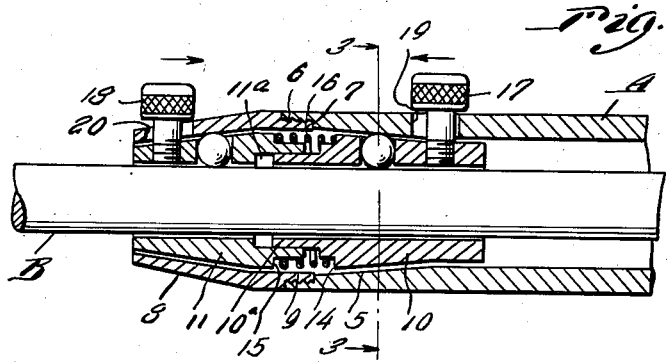
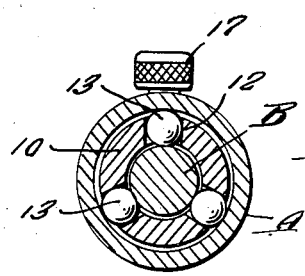
Fig. 3.
Inventor
Peter Yannetta
By James F. Splain
Attorney Patented Dec. 1, 1936

2,062,628

UNITED STATES PATENT OFFICE 2,062,628

CLUTCH LOCK

Peter Yannetta, Waterbury, Conn.

Application January 25, 1935, Serial No. 3,527

5 Claims. (Cl. 287—58)

This invention is a device for securing two elements together in a novel and substantially automatic manner for the purpose, mainly, of preventing relative longitudinal movement of the members.

An object of the invention is to provide a device of this character which can be used for any one of a number of purposes and which may be made and used as a part of a keeper device for casement windows in a manner to secure the rod of such a device at the desired adjustment for holding the window in open position; as a part of the construction of, and for use with a lighting fixture of the type employing a bell and a suspension rod in a manner to secure the suspension rod at the desired vertical adjustment and in locked engagement with the bell of the fixture; and as a part of the construction of, and for use with other similarly associated elements for securing said elements together and against relative longitudinal movement.

A further object of the invention is to provide a securing device of the character above mentioned that is characterized by extreme simplicity in construction and operation, economy of parts, and which can be manually manipulated for releasing the parts secured thereby.

The invention together with its objects and advantages will be best understood from a study of the following description taken in connection with the accompanying drawing wherein:—

Figure 1 is an elevational view illustrating the application of the invention.

Figure 2 is a longitudinal sectional view through the device.

Figure 3 is a transverse sectional view taken substantially on the line 3—3 of Figure 2.

Referring to the drawing by reference numerals it will be seen that A indicates one of the elements and B the other of the elements with which the securing device may be used for securing, for example, the element B against longitudinal movement relative to, and through the element A, the latter being in the present instance, in the nature of a sleeve, and the element B being in the nature of a rod.

In adapting the device to the elements shown one of the elements, for example, the element A at one end is provided with a conical bore 5, an internal thread 6 and an internal shoulder 7. A substantially conical end or tip 8 is provided at its largest end with an integral threaded pin 9 that screws into the threaded end of the element A as shown.

Slidably disposed about the element B internally of the sleeve A is a tapered locking member or cone 10 while a somewhat similarly constructed female locking cone 11 operates within the removable end or extension 8. At its largest end the male locking member 10 is provided with an integral pin or projection 10a that is slidably accommodated in a socket 11a provided in the largest end of the female locking member 11.

As best shown in Figures 2 and 3 each of the locking members 10, 11 is provided intermediate its ends with a series of circumferentially spaced, preferably three holes 12 in which operate locking balls or similar spherical elements 13. The elements 13 engage the periphery of the element B and cooperate with the tapered bores of the element A and extension 8 to lock the element B against longitudinal movement relative to the element A in either direction.

The locking cones 10 and 11 are provided with shoulders 14 and 15, respectively, and adjacent their joined ends and disposed about said ends of the locking element is a coil spring 16 the ends of which abut the shoulders 14 and 15 as shown in Figure 2 for normally urging the cones 10 and 11 in reverse directions and thereby urge the balls 13 into frictional and positive engagement with the element B, the element A and the extension 8 of the element A in a manner to positively secure the element B against longitudinal movement relative to the element A. For manipulating the locking members 10 and 11 against the action of the spring 16 to release the element B, said locking members 10 and 11 adjacent their respective smallest ends have secured thereto in any suitable manner head equipped manipulating pins 17 and 18 that operate in slots 19 and 20, respectively, provided in the element A and its conical end or extension 8. Obviously by grasping the heads of the pins 17 and 18 in a manner, for example, as suggested in Figure 1, and moving the pins 17 and 18 in the directions indicated by the arrows in Figure 2, the locking members 10 and 11 will move inwardly toward one another thus moving the balls 13 out of frictional engagement with the conical bores of the element A and its extension 8 resulting in a freeing of the element B and permitting movement of the element B relative to the element A or vice versa, as the case may be.

It is thought that a clear understanding of the invention, its purpose, manner of functioning, and the numerous uses to which it may be put will be clear to those skilled in the art from the above detailed description.

What is claimed as new is:—

1. In a securing device of the class described, the combination with inner and outer relatively movable members, said outer member having oppositely tapered bores, tubular locking cones operating in said bores and having openings therethrough receiving said inner member, and each of said locking cones having lateral openings therethrough, balls operating in said lateral openings and arranged to wedge between the exterior of said inner member and said walls of the tapered bores of the outer member in a manner to securely retain the inner and outer members locked against relative movement, said locking cones having slidably engaged portions operating to maintain said cones in axial alignment.

2. In a securing device of the class described, the combination with inner and outer relatively movable members, said outer member having oppositely tapered bores, tubular locking cones receiving said inner member and operating in said bores and having lateral openings therethrough, balls operating in said lateral openings for wedged engagement between the exterior of said inner member and the walls of said tapered bores in a manner to securely retain the inner and outer members locked against relative movement, and manipulating pins connected with said locking cones and operating through slots provided in the outer member.

3. In a securing device of the class described, the combination with inner and outer relatively movable members, said outer member having oppositely tapered bores, tubular locking cones operating in the bores and receiving said inner member, each of said locking cones having lateral openings therethrough, balls operating in said lateral openings for wedged engagement between the exterior of said inner member and the walls of said tapered bores in a manner to securely retain the inner and outer members locked against relative movement, and manipulating pins connected with said locking cones and operating through slots provided in the outer member, and a spring device interposed between the confronting ends of said locking cones and normally urging said cones in opposite directions for producing said wedging engagement of said balls between said inner and outer members.

4. In a device of the character described, an outer member having a bore formed with two oppositely tapered portions, an inner member of substantially uniform diameter extending through the said outer member, slidable locking cones on said inner member within said oppositely tapered portions, each cone being provided with a series of circumferentially spaced openings therethrough, said openings containing balls arranged to engage the outside of said inner member and the walls of the respective tapered portions of the outer member for securing the inner and outer members against relative movement in either of two opposite directions, and means traversing said outer member and individually engaging said locking cones and limiting the movement of said locking cones relative to said outer member and to each other.

5. In a device of the character described, a tubular outer element having aligned oppositely tapered bore sections, apertured tubular locking cones operating in said sections, an inner element extending through said locking cones, said locking cones comprising a female cone having a socket at the larger end thereof, and a male cone having an extension slidably engaging in said socket, a spring interposed between the cones at the confronting ends thereof and normally urging said cones apart and toward the smaller ends of the respective tapered bore sections, each locking cone being provided with a series of circumferential openings, balls operating in said openings and arranged for wedging engagement with the inner and outer elements for locking said elements against relative movement, and operating pins for said locking cones operating in slots provided in said outer element.

PETER YANNETTA.